United States Patent
Vasconcelos et al.

(10) Patent No.: US 10,752,550 B2
(45) Date of Patent: Aug. 25, 2020

(54) THERMO-INSULATING CONCRETE

(71) Applicants: Vale S.A., Rio de Janeiro (BR); Universidade Federal De Ouro Preto—UFOP, Ouro Preto (BR)

(72) Inventors: Renata Eliane Frank Vasconcelos, Vitória (BR); Júlia Castro Mendes, Ouro Preto (BR); Ricardo Andre Fiorotti Peixoto, Ouro Preto (BR)

(73) Assignees: VALE S.A., Rio de Janeiro (BR); Universidade Federal De Ouro Preto—UFOP, Ouro Preto (BR)

( * ) Notice: Subject to any disclaimer, the term of this patent is extended or adjusted under 35 U.S.C. 154(b) by 0 days.

(21) Appl. No.: 16/414,407

(22) Filed: May 16, 2019

(65) Prior Publication Data
US 2019/0352231 A1    Nov. 21, 2019

(30) Foreign Application Priority Data
May 18, 2018 (BR) .......................... 1020180101935

(51) Int. Cl.
| | |
|---|---|
| C04B 28/04 | (2006.01) |
| C04B 14/06 | (2006.01) |
| C04B 14/42 | (2006.01) |
| C04B 24/20 | (2006.01) |
| E04B 1/76 | (2006.01) |

(Continued)

(52) U.S. Cl.
CPC .............. *C04B 28/04* (2013.01); *C04B 14/06* (2013.01); *C04B 14/42* (2013.01); *C04B 24/20* (2013.01); *E04B 1/76* (2013.01); *E04G 23/00* (2013.01); *C04B 2103/304* (2013.01); *C04B 2201/30* (2013.01); *E04B 2001/746* (2013.01)

(58) Field of Classification Search
CPC ......... C04B 28/04; C04B 24/20; C04B 14/42; C04B 14/06; C04B 2201/30; C04B 2103/304; C04B 2111/28; C04B 2111/40; C04B 2103/48; E04G 23/00; E04B 1/76; E04B 2001/746
See application file for complete search history.

(56) References Cited

U.S. PATENT DOCUMENTS

| | | | | |
|---|---|---|---|---|
| 5,641,584 A | * | 6/1997 | Andersen .................. | B28B 1/00 106/675 |
| 6,224,250 B1 | * | 5/2001 | Kreinheder ............... | B28C 7/02 360/16 |

(Continued)

OTHER PUBLICATIONS

Asokan, P. et. al., "Improvement of the Mechanical Properties of Glass Fibre Reinforced Plastic Waste Powder Filled Concrete", Construction and Building Materials, vol. 24, pp. 448-460, 2010.
(Continued)

*Primary Examiner* — Joshua K Ihezie
(74) *Attorney, Agent, or Firm* — Arent Fox, LLP

(57) ABSTRACT

The present invention refers to a new concrete composition comprising fiberglass waste and an air-entraining additive. The concrete presents a thermo-insulating performance far superior to conventionally produced concretes. The present invention is mainly intended for the construction industry, in non-structural applications for thermal insulation. The use of fiberglass waste reduces the consumption of natural aggregates and allows for the use of waste which is expense to dispose of.

9 Claims, 1 Drawing Sheet

(51) Int. Cl.
*E04G 23/00* (2006.01)
*C04B 103/30* (2006.01)
*E04B 1/74* (2006.01)

(56) References Cited

U.S. PATENT DOCUMENTS

| | | | | |
|---|---|---|---|---|
| 2006/0217464 A1* | 9/2006 | Guevara | ............... | C04B 16/08 524/2 |
| 2007/0027224 A1* | 2/2007 | Cowan | ............... | C04B 16/08 521/56 |
| 2007/0056479 A1* | 3/2007 | Gray | ............... | C04B 24/005 106/819 |
| 2007/0056481 A1* | 3/2007 | Gray | ............... | C04B 28/02 106/819 |
| 2007/0062415 A1* | 3/2007 | Guevara | ............... | C04B 16/08 106/638 |
| 2008/0227891 A1* | 9/2008 | Jarvie | ............... | B28C 5/003 524/5 |
| 2008/0275149 A1* | 11/2008 | Ladely | ............... | C04B 16/082 521/55 |
| 2009/0078161 A1* | 3/2009 | Woolfsmith | ............... | C04B 16/082 106/692 |
| 2009/0197991 A1* | 8/2009 | Bury | ............... | C04B 28/02 524/2 |
| 2010/0139523 A1* | 6/2010 | Gray | ............... | C04B 28/02 106/18.24 |
| 2010/0197818 A1* | 8/2010 | Sweat | ............... | C04B 20/10 521/56 |
| 2012/0227630 A1* | 9/2012 | Gray | ............... | C04B 38/08 106/672 |
| 2016/0060169 A1* | 3/2016 | Byrd | ............... | C04B 14/24 106/676 |
| 2017/0190617 A1* | 7/2017 | Hill | ............... | C04B 12/00 |
| 2017/0260092 A1* | 9/2017 | Ong | ............... | C04B 28/02 |

OTHER PUBLICATIONS

Belt J. R. et. al., "Recycling of FRP Composites: Reusing Fine GFRP Waste in Concrete Mixtures", Journal of Cleaner Production, vol. 19, pp. 1745-1753, 2011.

Osmani M. et. al, "Utilization of Glass Reinforced Plastic Waste in Concrete and Cement Composites", Second International Conference on Sustainable Construction Materials and Technologies, vol. 2, pp. 1127-1137, 2010.

* cited by examiner

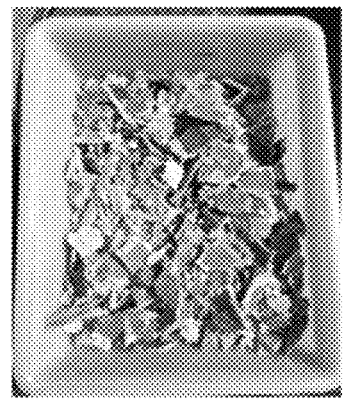
Figure 1                                    Figure 2
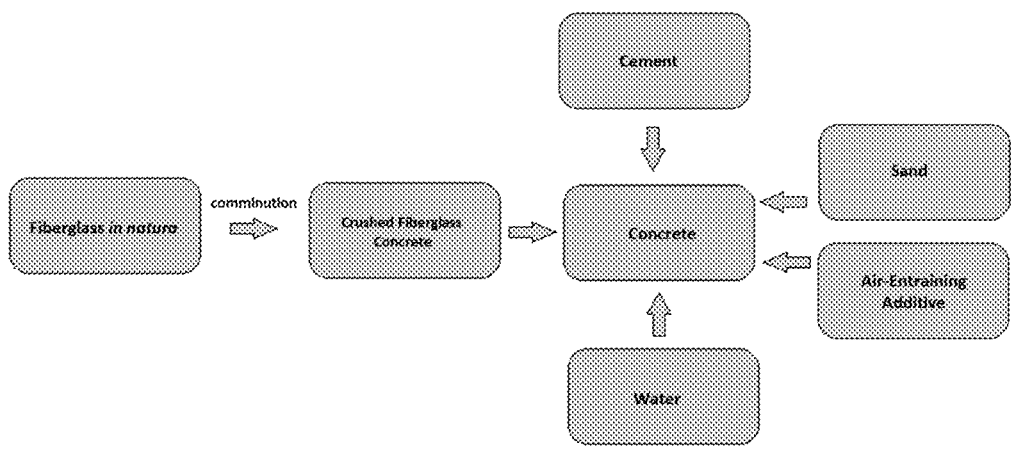
Figure 3

THERMO-INSULATING CONCRETE

CROSS-REFERENCE TO RELATED APPLICATION

This application claims priority to Brazilian Patent Application No. BR 1020180101935 filed May 18, 2018. The disclosure of the priority application is hereby incorporated by reference in its entirety.

FIELD OF THE INVENTION

This invention refers to a new concrete composition which comprises fiberglass waste and an air entraining additive. The concrete of this invention presents thermo-insulation performance far superior to that of conventionally produced concretes. This invention is primarily intended for the civil construction industry, in non-structural applications for thermal insulation. The use of fiberglass waste reduces the consumption of natural aggregates and allows for the use of waste that is expensive to dispose of.

BACKGROUND OF THE INVENTION

Large volumes of reinforced fiberglass polymers (FRP), or simply fiberglass, are produced annually for a wide range of applications due to their properties, such as corrosion resistance in aggressive environments, good tensile and flexural strength, and low weight. The increase in demand and consequent growth in its production have resulted in an increase in the quantity of fiberglass waste. This waste represents a major challenge for the industry in terms of waste management. Currently, most of this waste is disposed of in landfills, generating high economic and environmental costs.

This situation has encouraged the productive sector to endeavor efforts for the development of new processes for fiberglass recycling. The main recycling processes for these composites can be divided into: a) incineration, with or without partial heat recovery of the combustion of the polymeric fraction; b) chemical or thermal recycling for elimination of the organic portion and reuse of the fibers; and c) mechanical recycling through comminution in order to fragment the material to the particle size of interest and then reuse it as an element in new composite materials. This latter recycling process has the advantage of not producing any type of pollutant, whether gases or solvents, unlike the first two processes.

This invention proposes the use of mechanically-recycled fiberglass waste in wholesale substitution of conventional coarse aggregates in the production of high-tech concrete, which can be used as a thermo-insulation barrier for refitting and thermal comfort, intended for construction industry.

Concrete is a composite material basically consisting of water, cement and small and coarse aggregates, which may or may not comprise additives for specific purposes, such as plasticity on fresh cement and delaying hardening, among others. This invention proposes to completely replace conventional coarse aggregates with fiberglass properly comminuted.

The use of recycled fiberglass in the production of concrete as a partial substitute for small aggregates is already described in the state of the art. Osmani et al. (2010) reveals a study of the use of pulverized fiberglass waste as part of the fine aggregate in the production of concrete. In this study, hundreds of specimens were tested with the replacement of 5% to 50% of the fine aggregate (sand) with recycled fiberglass powder. The best results, in terms of mechanical properties, corresponded to only 5% and 15% substitution. The study used only a small proportion of fiberglass. In addition to this, the recycled fiberglass must be finely pulverized before being used in the production of the concrete.

Correa et al. (2011) also reveals a series of tests to confirm the behavior of the concrete where part of the fine aggregate is replaced by pulverized fiberglass. The experiments replaced 5 to 20% of the fine aggregate (sand) with recycled fiberglass with particle size less than 63 µm. Test specimens were produced with the addition of a superplasticizer. The results obtained also indicate an optimum proportion of 5% substitution, where the reduction in the mechanical strength of the concrete is less significant.

Asokan et al. (2010) reveals a battery of experiments with concrete containing pulverized recycled fiberglass with the aim of improving the mechanical properties of this type of concrete. Good results were obtained with the addition of 2% of a superplasticizer (polycarboxylate) for a substitution of only 5 to 15% of the fine aggregate by the fiberglass waste.

Although the studies cited obtained satisfactory results for the performance of the concrete produced with fiberglass, they reveal, in all cases, that there is a need to use fine particle fiberglass, which significantly increases the cost of the process. In addition to this, the fiberglass waste is incorporated only as a small portion of the fine aggregates.

OBJECTIVES OF THE INVENTION

One of the objectives of this invention is to reduce the environmental impact generated by the disposal of reinforced fiberglass polymers, which is possible through using of this material as a coarse aggregate for the production of concrete.

Another objective of the invention is to offer a more economical and environmentally correct alternative for inputs for the production of concrete. The use of fiberglass waste in the production of concrete can also lead to a reduction in costs.

A third objective of the invention is to produce an economical concrete, with a simplified production process, which is used as a thermo-insulation barrier for refitting and thermal comfort in construction industry.

SUMMARY OF THE INVENTION

This invention reveals a new thermo-insulation concrete which comprises fiberglass waste. The concrete of this invention comprises cement, fine aggregate, fiberglass waste as a coarse aggregate, water and, alternatively, one or more air-entraining additives.

The complete replacement of conventional coarse aggregate by fiberglass waste, which is present in a greater proportion than the fine aggregate in the concrete, allows for the use of fiberglass in larger particles, not requiring its pulverization, in addition to being integrated into the concrete in a greater proportion.

BRIEF DESCRIPTION OF THE DRAWINGS

The present invention will now be described with reference to the attached figures, where:

FIG. 1 reveals a photograph that shows the appearance of the fiberglass waste in natura, before comminution.

FIG. 2 shows a photograph of the fiberglass waste already crushed and ready to form the concrete.

FIG. 3 shows a simplified diagram of the production process of the thermo-insulation concrete of the present invention.

DETAILED DESCRIPTION OF THE INVENTION

The present invention will be detailed below, by way of example and not in a limiting manner, since the materials and methods revealed herein may comprise different details and procedures, without exceeding the scope of the invention. Unless otherwise indicated, all parts and percentages revealed below, are by weight.

The present invention refers to a thermo-insulation concrete comprising fiberglass waste as a coarse aggregate.

As widely known to persons skilled in the art, concretes essentially consist of a mixture of cement, fine aggregate, coarse aggregate, water and, optionally, additives to improve their performance.

Aggregates, by definition, are any granular material such as sand, gravel or blast furnace slag, for example. The aggregates are "coarse" when their particle size is greater than 4.8 mm and less than 25 mm, such that fine aggregates have a particle size less than 4.8 mm.

In the context of this invention, the coarse aggregate is wholly substituted by comminuted fiberglass waste. The fiberglass waste can be crushed in any way known to the state of the art, such as mechanically crushed in suitable equipment, such as a crusher of the Shredder type with 25 mm blades.

The cement used in the production of the thermo-insulating concrete of the present invention can be any type of Portland cement known to the state of the art. Preferably, Portland cements of type CP-I and CP-III RS 40 are used. It is widely known to the state of the art that Portland cements are hydraulic cements composed primarily by silicates, and calcium and aluminum oxides.

Any types of coarse aggregates known to the state of the art and commonly used in the production of concretes can be used as fine aggregates in the present invention. In a preferential mode, sand is used as a fine aggregate in the production of concretes in accordance with the present invention. As is known to persons skilled in the art, sands for the production of concrete are preferably composed of silica—quartz.

In an alternative mode, in the context of the present invention, other waste can be used as fine aggregates, such as steel plant slags, quartzite waste, iron ore tailings, or other granular waste. The use of waste as a fine aggregate is also capable of making the product even more sustainable in terms of its environmental and economic function.

As known to persons skilled in the art, air-entraining additives introduce small air bubbles which are dispersed through the concrete matrix. The air-entraining additive used in the present invention can be any air-entraining additive known to the state of the art. It is also possible to use a mixture of one or more air-additives in the context of the present invention. Preferably, surfactants are used as air-entraining additives in the concrete of the present invention.

In a preferential mode, the air-entraining additive of this invention is based on LAS (Linear Alkylbenzene Sulfonate), which is a type of common surfactant, present in commercially available detergents, which is biodegradable. Because they are biodegradable, the use of LAS-based air-entraining additives also renders the concrete of the invention more environmentally friendly.

Although commercial LAS consists of more than 20 individual components, the ratio between the various homologues and isomers, which represent different alkyl chain lengths and aromatic ring positions, is relatively constant among the different detergents and cleaning applications. Due to the narrow consistency of the mixtures, their commercial uses and effects, LAS is generally cited as a substance. It is worth noting that this category encompasses, among others, dodecyl benzene sulfonate, a substance commonly used as an air-entraining additive, but not biodegradable.

Preferably, the air-entraining additive is used in a proportion of 0.1 to 1% by weight of cement.

The concrete components of this invention are used preferably in the proportions of: cement:fine aggregate:fiberglass waste, ranging from 1:1:1.5 to 1:3:3. Preferably, the components are used in a proportion of 1:1.8:2.42 (cement:fine aggregate: fiberglass waste).

The thermo-insulating concrete of the present invention can be produced in any conventional form known to the state of the art.

In a preferential configuration, the production process of the concrete of the present invention comprises the following steps:

a) Adding the coarse aggregate (fiberglass waste) and one third of the total amount of water to a concrete mixer and mixing for about 30 seconds;

b) Adding the cement and another third of the water to the mixture obtained and mixing for another 30 seconds; and c) Adding the fine aggregate, the remainder of the water and the additives, and mixing the concrete until it becomes homogeneous.

The amount of water used in the present invention will vary depending on the type of concrete one wishes to obtain, and can be easily calculated by persons skilled in the art. Preferably, a sufficient amount of water is used so that the w/c (water/cement) factor varies from 0.45 to 0.60, preferably from 0.50 to 0.55.

The concrete, once mixed and mechanically homogenized, can be used by the construction industry for a wide variety of applications, such as in the production of light panels for sealing or non-structural elements. Due to the nature and form of the fiberglass particles, the non-additivated fresh concrete, or concrete with conventional additives, does not present good plasticity, and less stability, which renders its production and use difficult as a material for molding constructive elements.

The air-entraining additive used has, among other purposes, the function of correcting this limitation, and providing sufficient workability, stability and viscosity to the fresh concrete. The final result is a lightweight and economical material with exceptionally low thermal conductivity. These qualities make this concrete effective for the thermal insulation of residential, commercial or even public buildings, reducing their energy consumption.

EXAMPLE

The following example is provided to assist comprehension of the present invention and should not be considered as limiting its scope.

Concretes were elaborated with six different compositions in accordance with the present invention, as presented in Table 1.

TABLE 1

DIFFERENT CONCRETE COMPOSITIONS TESTED

| Dosage | | Quantity (kg) | | | Water/Cement ratio |
|---|---|---|---|---|---|
| | | Cement | Sand | Fiberglass Waste | |
| Air-Entrainning Additive | 0.05% | 1 | 1.8 | 2.42 | 0.58 |
| | 0.1 | 1 | 1.8 | 2.42 | 0.55 |
| | 0.2 | 1 | 1.8 | 2.42 | 0.55 |
| | 0.4 | 1 | 1.8 | 2.42 | 0.54 |
| | 0.8% | 1 | 1.8 | 2.42 | 0.52 |
| | 1.0% | 1 | 1.8 | 2.42 | 0.50 |

For the production of the concrete, the samples of fiberglass waste were separated and comminuted in a Shredder crusher with 25 mm blades. The fiberglass waste consists of scrap tiles, plates, profiles and other products made of fiberglass reinforced plastic pre-separated for disposal. This waste was used as a coarse aggregate.

Table 2 shows the chemical analysis of fiberglass waste used in this example. The presence of silica and alumina contributes to the generation of the hydration products, which form from the finely dispersed fraction of the fiberglass inside the pores generated by the air-entraining additive, producing porous, non-permeable matrices which are, thus, more durable.

TABLE 2

CHEMICAL ANALYSIS OF FIBERGLASS WASTE

| | $SiO_2$ (%) | $Al_2O_3$ (%) | CaO (%) | $SO_3$ (%) | $Fe_2O_3$ (%) | $TiO_2$ (%) | Other |
|---|---|---|---|---|---|---|---|
| Fiberglass waste | 42.0 | 32.2 | 19.2 | 2.3 | 2.2 | — | 2.1 |

Table 3 shows the physical properties of the aforementioned fiberglass waste. The fibers obtained from the processing of the fiberglass waste contribute to the reduction in the weight of the matrix (pre-cast parts), given its relatively low density.

TABLE 3

PHYSICAL PROPERTIES OF THE FIBERGLASS WASTE

| Density ($g/cm^3$) | Specific surface ($m^2/g$) | Particle diameter (μm) | | |
|---|---|---|---|---|
| | | D10% | D50% | D90% |
| 1.711 | 3.347 | 2.101 | 18.59 | 70.15 |

The size distribution of the fiberglass waste used in the present invention is shown in Table 4. The inclusion of light elements and dimensions equivalent to the dimensions of the coarse aggregates produces matrices suitable for the action of the air-entraining additives, contributing to the performance of the thermo-insulation.

TABLE 4

FIBERGLASS WASTE PARTICLE DISTRIBUTION

| Aperture (mm) | % Retained |
|---|---|
| 100 | 0 |
| 75 | 0 |
| 63 | 0 |
| 50 | 0 |
| 37.5 | 0 |
| 31.5 | 0 |
| 25 | 9.5 |
| 19 | 11.9 |
| 12.5 | 59.6 |
| 9.5 | 12.1 |
| 6.3 | 1.6 |
| 4.75 | 1.3 |
| 2.36 | 0 |
| Passing | 3.7 |

For the performance of the tests, Portland cement of the CP-III RS-40 type, commercially known as *National Cement* and produced by the Company *Brennand Cements*, was used. As a fine aggregate, river-washed sand from the *Rio do Peixe* river in Ponte Nova-MG was used. As an air-entraining additive, a LAS-based surfactant presents in most neutral detergents (of the dishwasher type) commercialized in Brazil, was used.

The concretes were produced using the mixture of fiberglass waste with a third of the total amount of water, with this first mixture being mixed for 30s in a concrete mixer. Then the cement and another third of the water was added, and mixed for a further 30s. Finally, the sand and air-entraining additive were added with the remainder of the water and the concrete was mixed until it became homogeneous.

For the purposes of comparison of the properties of interest, a conventional concrete was also produced using natural aggregates, observing the same conditions and technological controls applied to the thermo-insulating concrete, in order to obtain an example capable of effectively parameterizing the properties of interest. The composition used for the production of the conventional concrete observed the proportion of 1:2.36:2.64 (cement:sand:coarse aggregate) and 0.55 water/cement factor, designed for resistance of 15 MPa at 28 days. As a coarse aggregate for the production of the conventional concrete, crushed metamorphic rock—gneiss (essentially consisting of quartz) was used, where MCD=25 mm (maximum characteristic dimension). The change in proportioning for the composition of the trace produced with natural aggregates, compared to fiberglass aggregates, was necessary in order to produce identical concretes, with the same performance and applicability, both for the fresh state (workability) and for the hardened state (mechanical properties); since the physical parameters of interest for the composition of the dosages (specific and unitary mass) differ for the natural aggregates and those obtained from the beneficiation of the fiberglasses.

It was observed that the addition of the LAS air-entraining additive positively influenced the workability of the matrices in the fresh state. However, a slight reduction in resistance to compression was observed, as presented in Table 5. The dosages were designed for a mechanical resistance of 15 MPa at 28 days. The resistance to compression was obtained by the diametral compression rupture of four cylindrical specimens with dimensions of 10/20 cm.

TABLE 5

COMPRESSIVE STRENGTH

| Compression | | 7 days | | 28 days | |
|---|---|---|---|---|---|
| | | Tension (MPa) | Deviation (%) | Tension (MPa) | Deviation (%) |
| LAS | 0.05% | 8.706 | 0.335 | 9.825 | 0.880 |
| | 0.1% | 9.105 | 0.046 | 10.243 | 0.397 |
| | 0.2% | 8.140 | 0.642 | 8.431 | 0.547 |
| | 0.4% | 6.908 | 0.920 | 7.106 | 0.673 |
| | 0.8% | 6.223 | 0.903 | 6.820 | 0.833 |
| | 1.0% | 6.040 | 0.902 | 6.502 | 0.622 |

The reduction in mechanical resistance was essentially induced by the properties of the fiberglass waste used in substitution of the coarse aggregates and collaterally by the addition of LAS, essential to the workability of the matrices. The association of the addition of LAS in concentrations of up to 1% in matrices containing fiberglass waste, may have been responsible for the reduction in mechanical resistance.

The final values for mechanical strength, although slightly below the design value, do not preclude the concretes obtained from being used in non-structural parts or elements and light panels for sealing. Moreover, an important property emerged. For the prototypes with added LAS, a property of great interest is observed: their thermal insulating capacity.

Tests were conducted to evaluate the thermal conductivity of the concretes. To this end, specimens were produced in the form of plates with dimensions of 300×300×40 mm. Thermal conductivity was determined in accordance with an experimental protocol in a continuous flow regime in an adiabatically isolated chamber. The equipment used to determine the thermal conductivity was the NETZSCH HFM 436 Lambda. The final value of the thermal conductivity is given by the average of the measurements of 3 specimens, for thermal load relative to the average temperature of 20° C., as recommended by NBR 15220-5—Part 5.

Table 6 shows the results of the thermal conductivity test, where significantly lower values indicate that the concrete of the invention is more effective as a thermal insulator than conventional concrete. The combination of the use of fiberglass waste as aggregates, combined with the action of the air-entraining additive, positively influenced the thermal performance of these matrices, producing concretes with much lower thermal conductivity than conventional concretes. This factor renders them eco-efficient materials which are also able to contribute to the thermal-environmental refitting of buildings, resulting in reduced energy consumption.

The apparent specific mass of the specimens produced was also measured. The apparent specific mass is calculated by measuring the mass of the concrete specimen for a given known volume. The values obtained, also shown in the Table 6, indicate that the substitution of the coarse aggregates for the fiberglass waste associated with the addition of LAS, produced lighter matrices (reduction in mass of up to 44%) suitable for use as thermal insulation in buildings (with reduced thermal conductivity of more than 5 times).

TABLE 6

RESULTS OF SPECIFIC MASS AND THERMAL CONDUCTIVITY OF THE CONCRETES TESTED

| | Apparent specific mass ($kg/m^3$) | Thermal conductivity at 20° C. (W/m · K) |
|---|---|---|
| Conventional Concrete | 2400 | 1.300 |
| Concrete in accordance with the invention (0.1% LAS) | 1470 | 0.265 |
| Concrete in accordance with the invention (1.0% LAS) | 1352 | 0.240 |

The tests clearly show that the complete substitution of the conventional coarse aggregate for fiberglass waste drastically decreased the thermal conductivity of the material, making it suitable for use where thermal insulation is required. Its optimal thermal performance, low cost and low density make this material an interesting alternative to conventional concrete.

REFERENCES

OSMANI, M.; PAPPU, A. Utilization of Glass Reinforced Plastic Waste in Concrete and Cement Composites. In: Second International Conference on Sustainable Construction Materials and Technologies, 2, 2010, Ancona, Italy, 2010, p.1127-1137.

Belt J. R.; ALMEIDA, N. M.; FIGUEIRA, J. R. Recycling of FRP composites: reusing fine GFRP waste in concrete mixtures. Journal of Cleaner Production, V. 19, p. 1745-1753, 2011.

ASOKAN, P.; OSMANI, M.; PRICE, A. Improvement of the mechanical properties of glass fibre reinforced plastic waste powder filled concrete. Construction and Building Materials, V. 24, p. 448-460, 2010.

The invention claimed is:

1. A thermo-insulating concrete comprising cement, a fine aggregate, fiberglass waste, water and one or more air-entraining additives, where:
   the proportion by weight of cement: fine aggregate: fiberglass waste ranges from 1:1:1.5 to 1:3:3;
   the ratio by weight of water/cement ranges from 0.45 to 0.60; and
   the quantity of air-entraining additive ranges from 0.1% to 1% by weight of the total mass of cement;
   wherein the fiberglass waste has a particle size between 4.8 mm and 25 mm.

2. The thermo-insulating concrete of claim 1, wherein the cement is a Portland cement of type CP-I or CP-III RS 40.

3. The thermo-insulating concrete of claim 1, wherein the air-entraining additive is a surfactant.

4. The thermo-insulating concrete of claim 3, wherein the air-entraining additive is a common surfactant based on Linear Alkylbenzene Sulfonate.

5. The thermo-insulating concrete of claim 1, wherein the fine aggregate has particle size less than 4.8 mm.

6. The thermo-insulating concrete of claim 1, wherein the fine aggregate is sand, steel plant slag, quartzite waste, iron ore tailings, or mixtures thereof.

7. The thermo-insulating concrete of claim 1, wherein the proportion by weight of cement: fine aggregate: fiberglass waste is from 1:1.8:2.42.

8. The thermo-insulating concrete of claim 1, wherein the ratio by weight of water/cement varies from 0.50 to 0.55.

9. A method for refitting a building comprising installing the thermo-insulating concrete of claim 1.

\* \* \* \* \*